(12) United States Patent
Kassamakov et al.

(10) Patent No.: US 7,415,173 B2
(45) Date of Patent: Aug. 19, 2008

(54) POSITION SENSOR

(75) Inventors: Ivan Kassamakov, Helsinki (FI); Pasi Vihinen, Helsinki (FI); Marcus Schorpp, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/423,927

(22) Filed: Jun. 13, 2006

(65) Prior Publication Data

US 2007/0286556 A1 Dec. 13, 2007

(51) Int. Cl.
*G02B 6/00* (2006.01)
*G02B 6/26* (2006.01)
*G02B 6/42* (2006.01)
*G01D 5/34* (2006.01)

(52) U.S. Cl. .............................. 385/13; 385/12; 385/15; 385/16; 385/25; 385/26; 385/31; 250/231.18

(58) Field of Classification Search .................... 385/12, 385/13, 15, 16, 25, 26, 31; 250/231.18
See application file for complete search history.

(56) References Cited

U.S. PATENT DOCUMENTS 6,571,030 B1 * 5/2003 Ramaswami et al. .......... 385/17

* cited by examiner

*Primary Examiner*—Frank G Font
*Assistant Examiner*—Jerry Blevins
(74) *Attorney, Agent, or Firm*—Banner & Witcoff, Ltd.

(57) ABSTRACT

A hinge position sensor comprises first and second members connected together to provide a hinge, and an optical fiber or wave-guide connected between the first and second members to provide a communication link between the first and second members. A laser or LED is coupled to the optical fiber or wave-guide to transmit optical signals between the first and second members and the optical signal is received by a photo-detector. The optical fiber or wave-guide is physically distorted by actuation of the hinge such that light escapes from the optical fiber or wave-guide. The optical power level received by the photo-detector is used to determine the position of the hinge.

18 Claims, 7 Drawing Sheets

POSITION SENSOR

FIELD OF THE INVENTION

The present invention relates to an optical position sensor, particularly, but not exclusively, to a fibre optic position sensor for sensing the position of a hinged lid of a portable electronic device such as a mobile telephone or a lap-top computer.

BACKGROUND TO THE INVENTION

It is common for a portable electronic device such as a lap-top computer or a mobile telephone to comprise a base, which includes the device's keypad, and a lid, which includes the device's screen or user display. In this type of device, the base and the lid are connected together by a hinge section such that the user display can be hinged to lie flat against the keypad when the device is not in use. By detecting when the hinge is closed, the device is able to detect when it may safely switch to a power-saving mode. This function allows the device to conserve battery power when the device is not in use.

It is known to detect the open/closed state of this type of hinge using a mechanical sensor, such as a boss-type media detection switch or a rotary-type position detection switch. However, the use of a mechanical sensor often imposes design constraints on the electronic device and may also require that bosses be fitted to the device's exterior. A mechanical sensor often also requires extra space on the motherboard of the device for the inclusion of a detector switch.

Alternatively, the position of the hinge may be detected using a solid-state relay. For example, it is known to magnetically detect the position of a lid with a system employing a Hall Integrated Circuit. However, this type of detector requires both space on the motherboard of the device and a level of standby power. In addition, magnetic switches of this type are liable to interfere with other types of sensor which may be integrated into the device, such as those employed by global positioning systems.

The use of optical proximity sensors is also known. However the surfaces of a proximity sensor's emitter and receiver must be kept clean in order for the sensor to function reliably.

SUMMARY OF THE INVENTION

According to the present invention, there is provided a hinge-position detection apparatus comprising a first member and a second member rotationally connected to one another so as to provide a hinge, a first optical fibre, a light emitter to transmit light through the optical fibre and a light detector to detect a power level of light emitted from the optical fibre, wherein the optical fibre is physically distorted by actuation of the hinge and the detected power level is used to determine the position of the hinge.

Preferably, a physical distortion in the optical fibre causes light to escape from the optical fibre and affects the optical power level detected by the light detector.

Preferably, the optical fibre is connected between the first member and the second member so as to traverse the hinge.

Preferably, the determined position of the hinge is used to control the operation of an electronic device.

More preferably, if the hinge is determined to be in a closed position, the apparatus is configured to switch one or more components of an electronic device to a power saving mode.

Preferably, the hinge is determined to be in a closed position if the detected optical power level reaches a predetermined threshold level.

Preferably, the light emitter is included in the first member, the light detector is included in the second member and the optical fibre is coupled between the light emitter and the light detector.

Preferably, the light detector is positioned to directly detect the emission of light from the optical fibre, the emission of light being caused by a physical distortion in the fibre.

More preferably, the apparatus includes a further optical fibre operable to direct the emission of light from the optical fibre to the detector.

Preferably, the light emitter comprises an LED or a laser, and the light detector comprises a photo-sensitive device, such as a photo-diode, photo-transistor or photo-resistor.

BRIEF DESCRIPTION OF DRAWINGS

In order that the invention may be more fully understood, embodiments thereof will now be described by way of illustrative example with reference to the accompanying drawings in which.

DETAILED DESCRIPTION OF THE PREFERRED EMBODIMENTS

Figure 1:
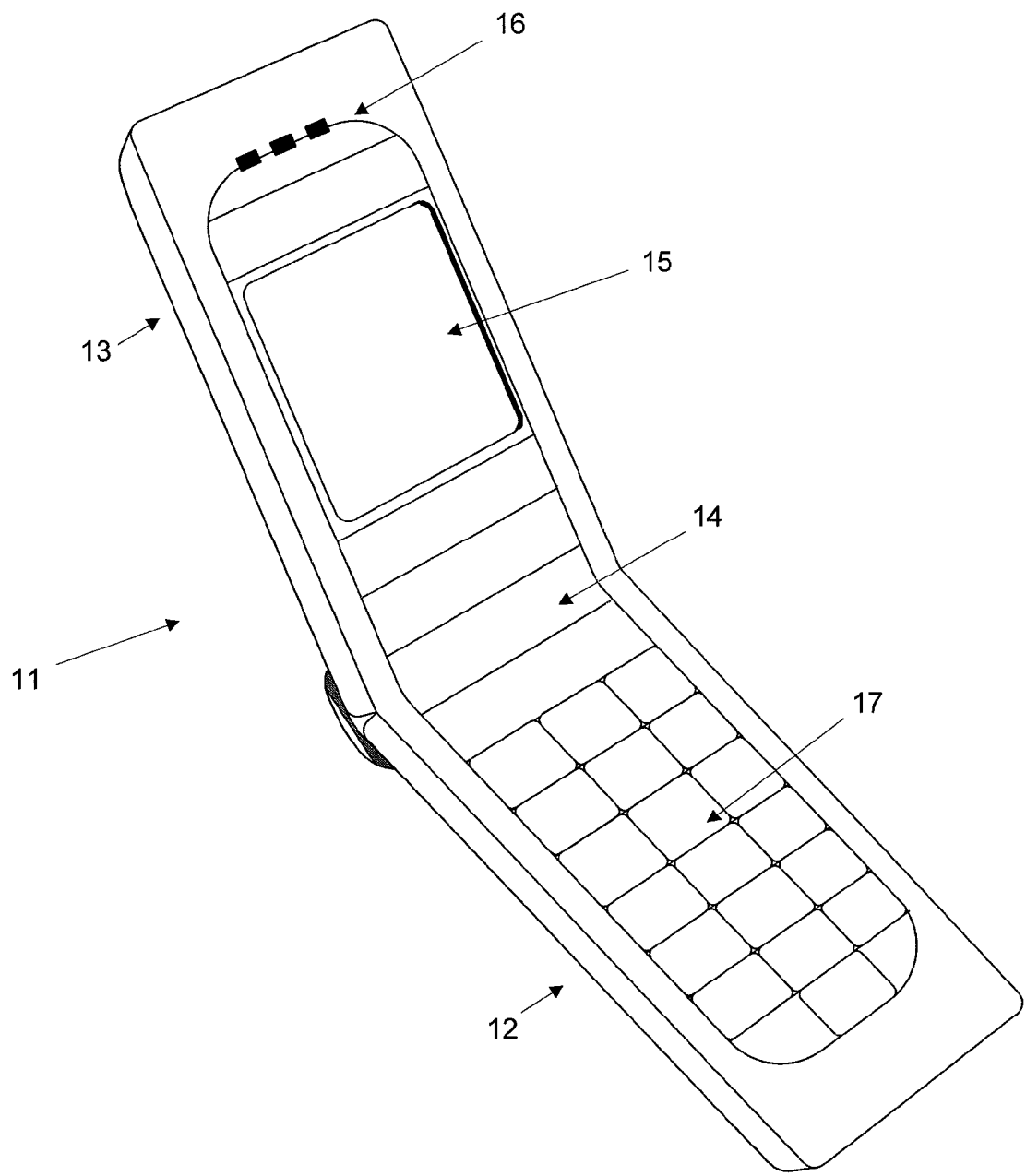
FIG. 1 is an illustration of a mobile telephone handset comprising a base and a lid connected together by a hinge joint.

Referring to FIG. 1, a hinge position detection apparatus is part of a mobile telephone handset 11. The mobile telephone handset 11 comprises a first member in the form of a base 12 and a second member in the form of a lid 13. The base 12 and lid 13 are connected together by a hinge joint 14, allowing the handset 11 to be movable between a closed position and an open position.

The telephone handset 11 is configured to operate in a cellular radio network, such as a GSM network, although it could be configured for use with other networks such as a 3G network or I-mode.

The telephone handset 11 is provided with a user display 15, for example in the form of a liquid crystal display (LCD) panel. The handset 11 is additionally provided with a loud-speaker 16, which is located in the lid 13 and is on the same surface as the user display 15. The base 12 of the handset 11 houses the remainder of the telephone's principal components, including a keypad 17.

The keypad 17 is located on the surface of the base 12 such that, when the hinge joint 14 is in the closed position, the keypad 17 directly faces the user display 15. Thus, the user display 15 and keypad 17 are not visible to the user when the hinge 14 is closed. An antenna 18 is located inside the base 12 such that it does not form part of the handset's exterior.

Figure 2:
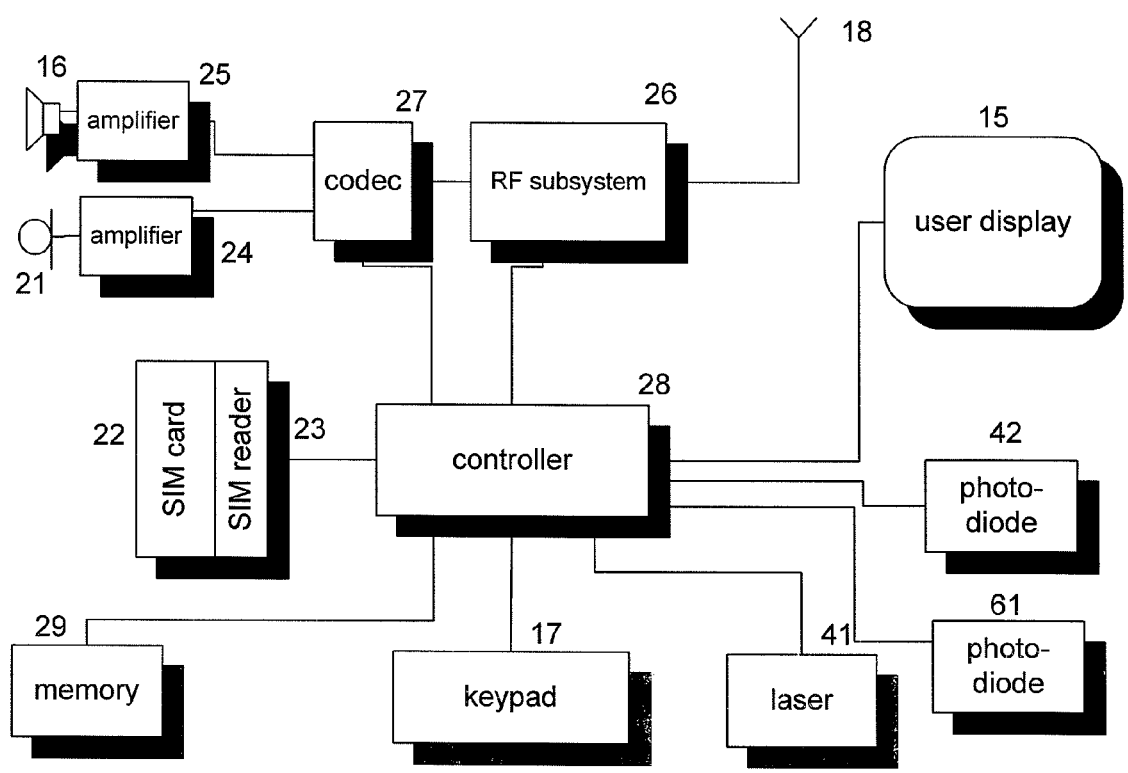
FIG. 2 is a block diagram illustrating components of the handset shown in FIG. 1.

Referring to FIG. 2, in addition to the user display 15, the loudspeaker 16, the keypad 17 and the antenna 18, the handset 11 comprises a microphone 21, a SIM card 22, a SIM card reader 23, amplifiers 24 and 25, an rf subsystem 26, a codec 27, a micro-controller 28 and a memory 29.

The rf subsystem 26 contains the circuits of the telephone's transmitter and receiver. The rf subsystem 26 is coupled to the antenna 18 for the reception and transmission of radio signals in a cellular mobile network.

The antenna 18 is connected through the rf subsystem 26 to the codec 27, which is configured to process signals under the control of the micro-controller 28.

The micro-controller 28 operates according to a program stored in the memory 29 and controls the operation of the handset 11. It is coupled to the rf subsystem 26 for supplying tuning instructions to a frequency synthesizer.

The user display 15 is connected to the micro-controller 28 for receiving control data and the keypad 17 is connected to the micro-controller 28 for supplying user input data. In FIG. 2, the memory 29 is shown separately from the micro-controller 28. However, the memory 29 and the controller 28 may also be included together in an integrated unit.

The amplifier 24 amplifies demodulated audio from the codec 27 and applies it to the loudspeaker 16. Acoustic signals, detected by the microphone 21, are pre-amplified by the amplifier 25 and sent to the codec 27 for coding.

Information concerning the identity of the user is held on the smart card 22 in the form of a GSM SIM card which contains the usual GSM international mobile subscriber identity (IMSI) and an encryption key $K_i$ that is used for encoding the radio transmission in a manner that is well known. The SIM card is removably received in the SIM card reader 23.

Figure 3:
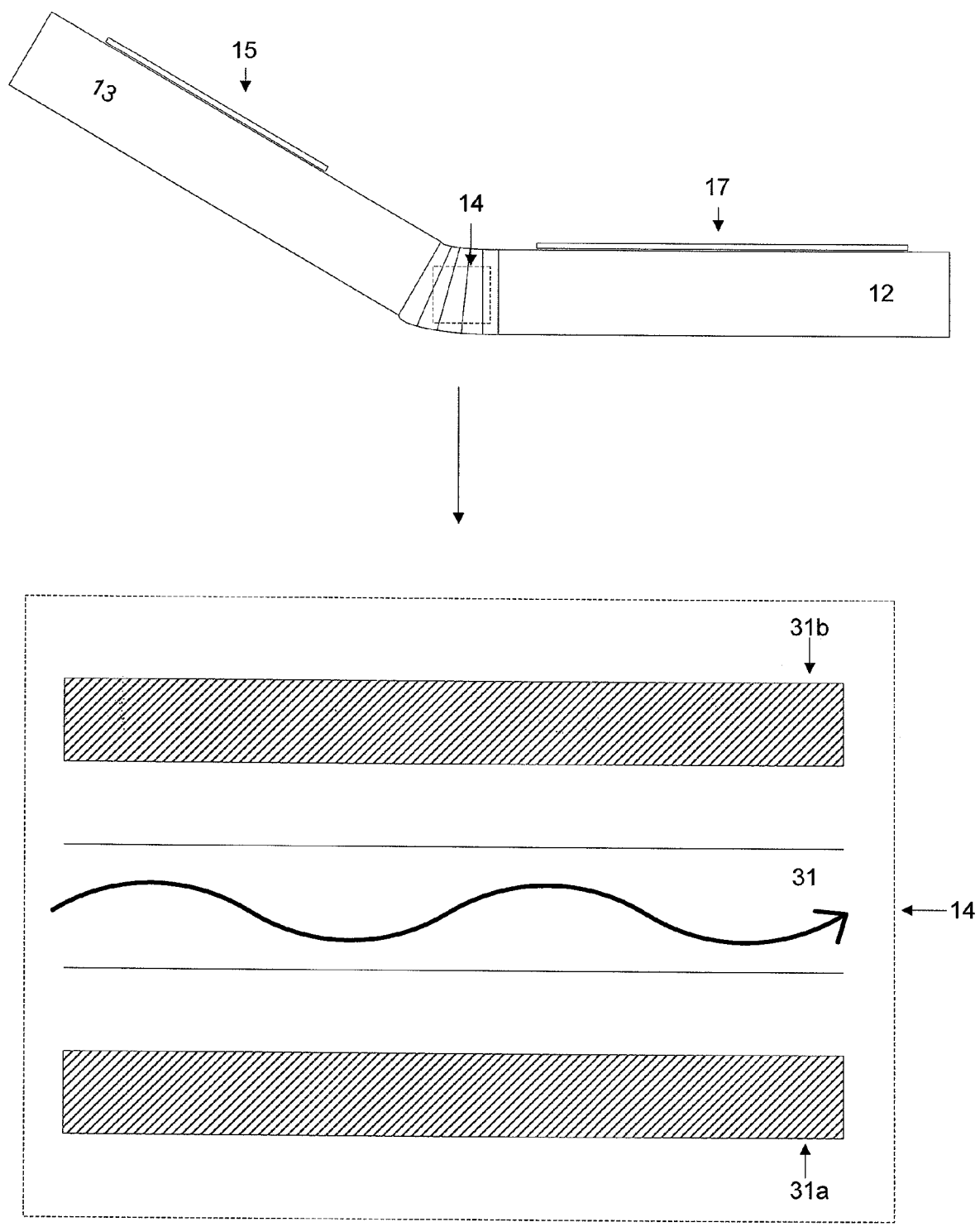
FIG. 3 is cross-sectional illustration of an optical fibre traversing the hinge joint of the handset.

Referring to FIG. 3, the handset 11 further comprises an optical wave-guide, for example an optical fibre 31, which is connected between the base 12 and the lid 13 via the hinge joint 14. The optical fibre 31 is connected so as to provide a transmission medium for optical communication between electronic circuits located in the base 12 and the lid 13.

Figure 4:
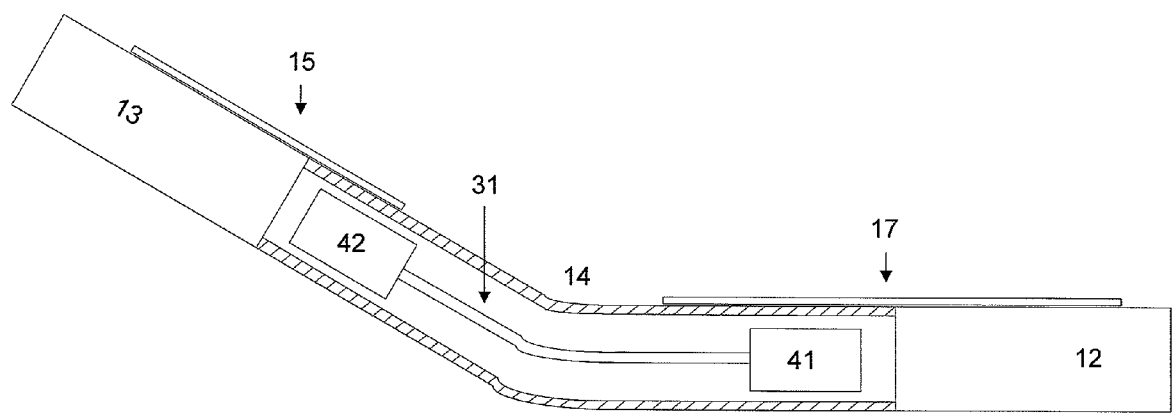
FIG. 4 is a cross-sectional illustration showing the coupling of the optical fibre between a laser and photo-diode.

Referring to FIG. 4, the base 12 of the handset 11 further includes a light emitter, for example a laser 41, which is adapted to emit red laser light in the wavelength range 630-670 nanometres. However, other suitable wavelengths could also be used. The laser 41 is coupled to the base-end of the optical fibre 31 and, as such, light emitted from the laser 41 enters the optical fibre 31 and is transmitted to the lid 13. The term "light" is used herein to mean electromagnetic radiation in the visible, infra-red and ultraviolet spectrum.

The optical fibre 31 comprises a central core 31a surrounded by a cladding layer 31b. The refractive index of the core 31a is of a different refractive index to that of the cladding 31b, meaning that light is confined to the core 31a by total internal reflection and is guided along the optical fibre 31. The optical fibre 31 may be either a graded optical fibre or a step-index optical fibre. The light transmitted through the optical fibre 31 may carry, for example, signals for controlling the operation of the user display 15 or loudspeaker 16. Alternatively, light transmitted through the optical fibre 31 may comprise control data for illumination at the lid side of the handset 11. In an alternative embodiment, the laser 41 could be replaced by a light-emitted diode (LED).

Further referring to FIG. 4, the lid 13 of the handset 11 includes a light detector, for example a photo-diode 42, which is coupled to the lid-end of the optical fibre 31. The photo-diode 42 is adapted to detect light transmitted through the fibre 31 from the laser 41 and is coupled to electronic circuits located in the lid 13 of the handset 11. Alternatively, instead of the photo-diode 42, the handset may comprise another type of photo-sensitive device such as a photo-transistor or photo-resistor.

The optical fibre 31 is fabricated from suitable plastics and is flexible in such a way that it is able to bend with the hinge joint 14 of the telephone handset 11. The use of plastics allows the optical fibre 31 to be adapted such that it may be bent to a very small radius. This is convenient as the optical fibre 31 should be able to comfortably bend to a radius enabling it to traverse the hinge joint 14 when the handset 11 in the closed position. The use of plastics also provides advantages in terms of transmission speed and is inexpensive in comparison to alternative materials. However, it will be appreciated that materials other than plastics can be used.

Figure 5:
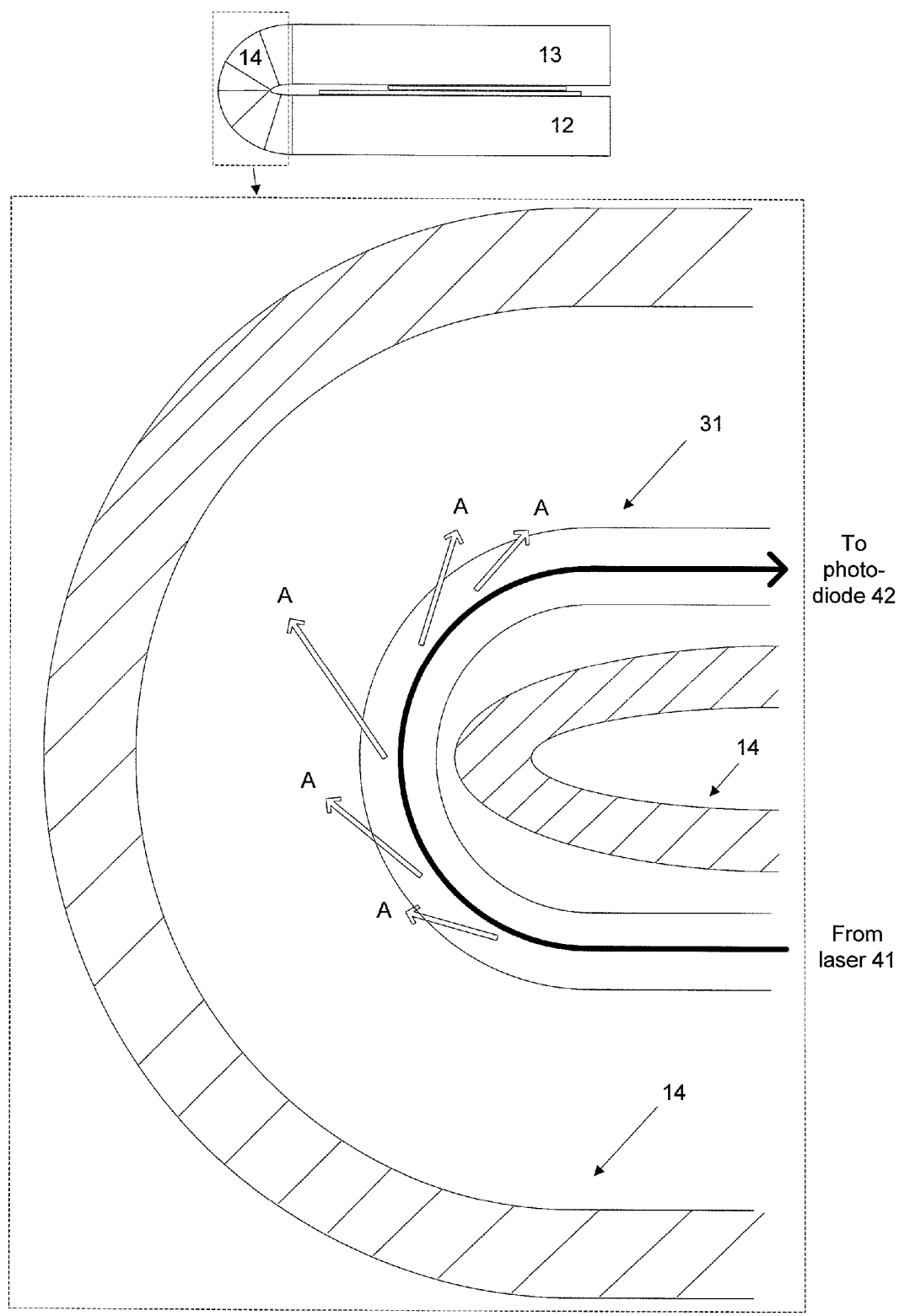
FIG. 5 is a cross-sectional illustration showing the escape of light from the optical fibre.

Referring to FIG. 5, as the optical fibre 31 is bent to the a radius enabling it to traverse the hinge joint 14 in the closed position of the handset 11, some of the light being transmitted through the fibre 31 does not meet the conditions for total internal reflection within the fibre 31 at the bend. The light which does not meet the conditions for total internal reflection escapes from the fibre 31, as illustrated schematically in FIG. 5 by arrows A. In consequence, the light not meeting the conditions for total internal reflection is not detected by the photo-diode 42. As the radius of the bend decreases, as the lid 13 is hinged to the closed position on the base 12, the amount of light escaping from the optical fibre 31 increases. Accordingly, for an optical signal of constant power transmitted from the laser 41, the optical power detected by the photo-diode 42 is a function of the radius of the bend in the optical fibre 31 and, therefore, is also a function of the position of the hinge joint 14.

The optical power detected at the photodiode 42 can be used to calculate the position of the hinge joint 14. Information concerning the position of the hinge joint 14 may then be processed to determine whether the handset 11 is open or closed and, accordingly, may be used to control the operational mode of the handset 11.

As shown in FIG. 3, the laser 41 and the photo-diode 42 are coupled to the controller 28, which is adapted to control the operational mode of the components of the handset 11 in dependence of the optical power level detected by the photo-diode 42. These components may include, for example, the user display 15 and loudspeaker 16. Accordingly, if the optical power level detected by the photo-diode 42 falls below a predetermined threshold, the handset is determined to be closed and the operational mode of the lid 13 is switched to a power-saving mode. Alternatively, the optical power level may be used to monitor the precise angle of the hinge and may be used for more complex control of the handset 11.

In an alternative embodiment, the laser 41 is comprised as part of the lid 13 and is coupled to the lid-end of the optical fibre 31. In this embodiment, the photo-diode 42 is comprised as part of the base and is coupled to the base-end of the optical fibre 31. Light transmitted through the optical fibre 31 may carry control signals for controlling the operation of the handset 11. The user display 15 may be a touch-sensitive display and may be operated by a user to select menu options from the display for operating the handset 11. Accordingly, the control signals transmitted through the optical fibre 31 may comprise, for example, information concerning a menu option selected by a user touching the display 15. This information may then be relayed to the micro-controller 28 and used for controlling the operation of the handset 11.

The photo-diode 42 is configured to detect the optical power received from the laser 41. Information concerning the optical power level detected at the base-end of the optical fibre 31 by the photo-diode 42 is supplied to the micro-controller 28 for controlling the operational mode of the handset 11. If the detected optical power level falls below the predetermined threshold value previously described, the handset 11 is determined to be closed and the micro-controller 28 switches the operational mode of the handset 11 to a power-saving mode. Alternatively, optical power level information supplied by the photo-diode 42 may be processed to control the operation of one or more components of the handset 11 directly.

Therefore, the optical power level detected by the photo-diode 42 is compared against a predetermined threshold value in order to determine whether the handset 11 is in the open or closed position. If the handset 11 is determined by the hinge-position detection apparatus to be in a closed position, the components of the handset 11 are configured to operate in a power saving mode. The handset 11 is thus able to increase the efficiency of its use of power and, accordingly, is able extend the standby time provided by a single charge of its battery (not shown).

Figure 6:
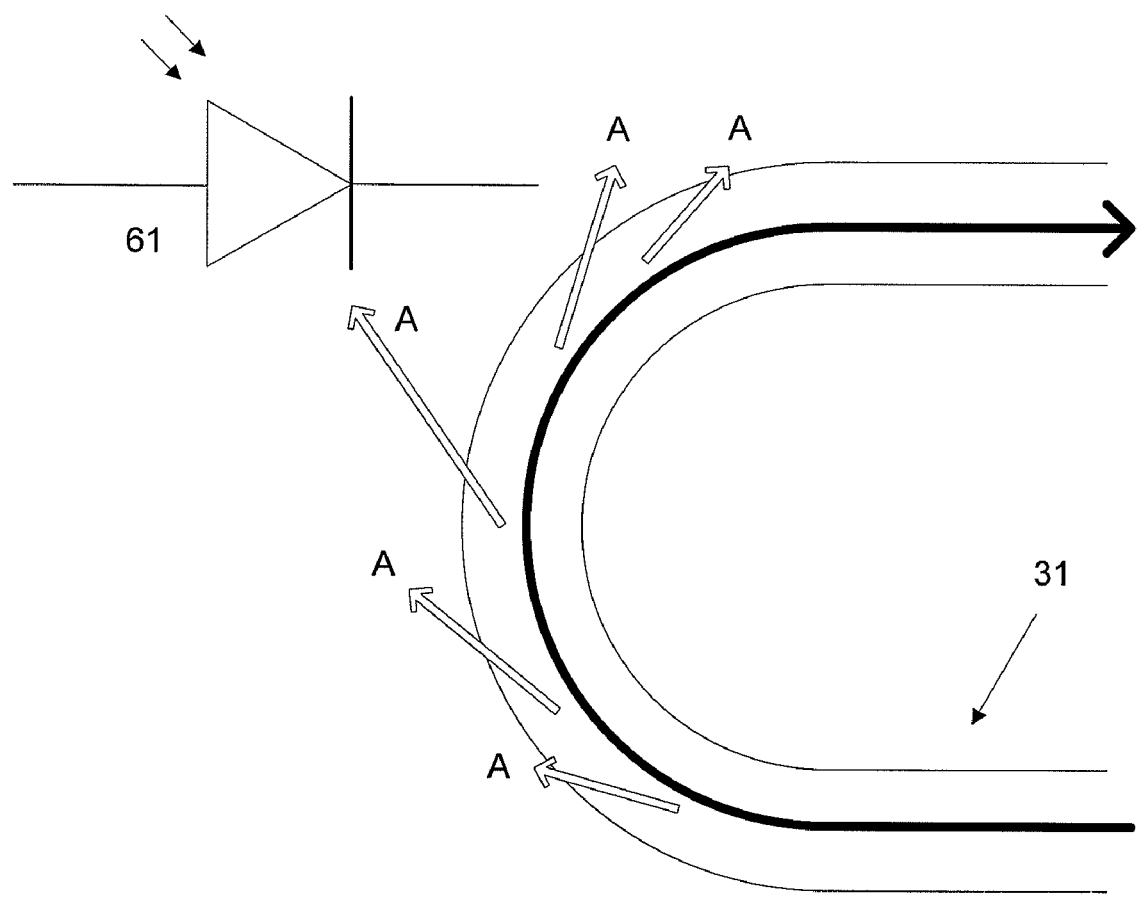
FIG. 6 is an illustration of the direct detection of light escaping from the optical fibre.

Referring to FIG. 6, in an alternative embodiment, a second light detector, for example a second photodiode 61, is located in the hinge joint 14 of the handset 11 to detect light escaping from the optical fibre 31. The second photodiode 61 is positioned in the area of maximum light emission from the bend in the optical fibre 31 to maximise the efficiency of detection of the light escaping from the fibre 31.

The second photodiode 61 is coupled to the micro-controller 28 such that information concerning the power of the optical light escaping from the fibre 31 may be relayed back to the controller 28 and processed to determine whether the handset 11 is in the open or closed position. Alternatively, the photodiode 61 may be configured to communicate the detected power level back to the controller 28 by wireless means, for example via a Bluetooth connection. In contrast with the previously described embodiments of the invention, the optical power level detected by the photo-diode 61 is inversely proportional to the radius of the hinge joint 14; as the radius of the bend in the optical fibre 31 decreases, the optical power level detected by the photo-diode 61 increases. By sensing the emitted light directly, the apparatus is able minimise the effect of errors due to losses caused by temperature fluctuations and aging of the optical fibre 31. In addition to determining whether the hinge joint 14 is open or closed, the relationship between the power level detected by the photo-diode 61 and the radius in the bend of the optical fibre 31 may be used to provide detailed information regarding the position of the hinge joint 14. For example, the optical power level detected by the photo-diode 61 may be used for calculating the angle of the hinge joint 14.

Alternatively, instead of the second photo-diode 61, the handset may comprise a different type of photo-sensitive device such as a photo-transistor or photo-resistor.

The controller 28 processes the optical power level information supplied by the photo-diode 61 to control the operational mode of the handset 11. If the optical power level detected by the photo-diode 61 increases above a predetermined threshold value, the handset 11 is determined to be closed and the micro-controller 28 switches the operational mode of the handset 11 to a power saving mode. Alternatively, the optical power level detected by the photo-diode 61 may be used to control the operational mode of one or more individual components of the handset 11 directly.

Figure 7:
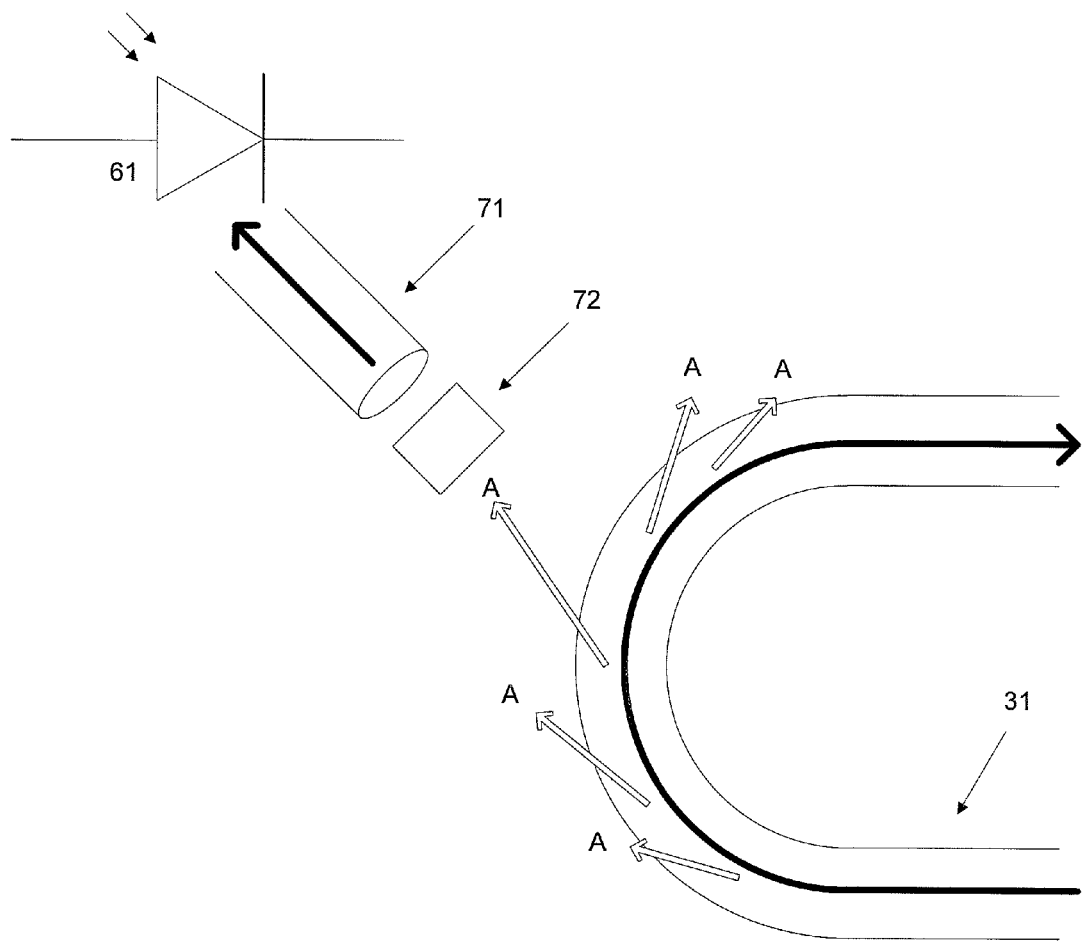
FIG. 7 is an illustration showing the direct detection of light escaping from the optical fibre via a second optical fibre.

Referring to FIG. 7, in an alternative embodiment, the second photo-diode 61 is comprised as part of the base 12 of the handset 11 and a second optical wave-guide, for example a second optical fibre 71, is positioned to receive light escaping from the bend in the first optical fibre 31 and to direct the light. Alternatively, instead of the second optical fibre 71, the handset may comprise alternative means for directing the light. The alternative means may comprise, for example, a light pipe comprising a length of plastic without cladding in which the plastic/air interface confines light to the light pipe. The optical fibre 71, optical wave-guide or light pipe may be used either with or without a light-collecting apparatus 72, for example comprising lenses, for collecting light escaping from the optical fibre 31.

The light inlet to the optical fibre 71 is positioned adjacent to the point of maximum emission of the first optical fibre 31 during bending thereof. The optical power level detected by the photo-diode 61 is used, either by the controller 28 or directly, to control the operational mode of the handset 11. If the optical power level detected by the photo-diode 61 increases above a predetermined threshold, the handset 11 is determined to be closed and the handset 11 is switched to a power saving mode.

The inclusion of the second optical fibre 71 provides more flexibility in the design of the handset 11 as the position of the second photo-diode 61 is not dictated by the position of maximum light emission from the first optical fibre 31. Accordingly, the photo-diode 61 may be positioned at a convenient position in the base 12 of the handset 11. Alternatively, the photo-diode 61 may be positioned in the lid 13 of the handset 11.

The optical fibre 31 may be surrounded by a protective jacket (not shown). In the described embodiments where light escaping from the bend in the fibre 31 is detected directly, if an LED is used instead of the laser 41, the jacket is removed at the point of maximum emission in order to allow the photo-diode 61 to detect the power level of the light escaping from the fibre 31. However, if the laser 41 is used as described, the protective jacket may be adapted such that the laser light is partially transmitted through the jacket. In this case, there is no need to remove the jacket in order for the photo-diode 61 to detect the light.

The control of the operational mode of the handset 11 has been described as being dependent on a detected power level of light at a photo-diode. However, the control of the handset could equally be dependent on a calculated signal-loss.

The implementation of the described hinge position detection apparatus involves minimal adaptation of the hardware of the handset 11. The components used for detection of the hinge's position are largely already present in many otherwise conventional mobile telephone handsets. Furthermore, apart from the optical fibre 31, no moving parts are used and, thus, the hinge-position detection apparatus can be considered to be extremely reliable. The hinge-position detection apparatus is not sensitive to electric or magnetic fields and will also not interfere with surrounding equipment, for example a GPS system, making use of such fields.

The above-described embodiments and alternatives may be used either singly or in combination to achieve the effects provided by the hinge-position detection apparatus. Although the hinge-position detection apparatus has been described with reference to a mobile telephone handset 11, the system is equally applicable to other types of electronic device which include a hinge section. These types of device include, for example, hand-held and lap-top computers, hand-held video games and personal digital assistants.

The invention claimed is:

1. An apparatus comprising:
   a first member and a second member rotationally connected to one another so as to provide a hinge;
   an optical wave-guide;
   a light emitter to transmit light through the optical wave-guide; and
   a light detector to detect an optical power level of light emitted from the optical wave-guide;
   wherein the optical wave-guide is physically distorted by actuation of the hinge and the detected power level is used to determine the position of the hinge.

2. An apparatus according to claim 1, wherein a physical distortion in the optical wave-guide causes light to escape from the optical wave-guide and affects the optical power level detected by the light detector.

3. An apparatus according to claim 2, wherein the optical wave-guide is connected between the first member and the second member so as to traverse the hinge.

4. An apparatus according to claim 1, wherein the determined position of the hinge is used to control the operation of an electronic device comprising the apparatus.

5. An apparatus according to claim 4, wherein if the hinge is determined to be in a closed position, the apparatus is configured to switch one or more components of the electronic device to a power saving mode.

6. An apparatus according to claim 1, wherein the hinge is determined to be in a closed position if the detected optical power level reaches a predetermined threshold level.

7. An apparatus according to claim 1, wherein the light emitter is included in the first member, the light detector is included in the second member and the optical wave-guide is coupled between the light emitter and the light detector.

8. An apparatus according to claim 7, wherein the hinge is determined to be open if the power level detected by the light detector increases above a predetermined threshold.

9. An apparatus according to claim 7, wherein the hinge is determined to be closed if the power level detected by the light detector falls below a predetermined threshold.

10. An apparatus according to claim 1, wherein the light detector is positioned to directly detect the emission of light from the optical wave-guide, the emission of light being caused by a physical distortion in the wave-guide.

11. An apparatus according to claim 10, wherein the hinge is determined to be closed if the power level of light detected by the light detector increases above a predetermined threshold.

12. An apparatus according to claim 10, wherein the hinge is determined to be open if the power level of light detected by the light detector falls below a predetermined threshold.

13. An apparatus according to claim 10, including a further optical wave-guide operable to direct said emission of light from the optical wave-guide to the detector.

14. An apparatus according to claim 13, wherein the further optical wave-guide is an optical fiber.

15. An apparatus according to claim 1, wherein the light emitter comprises an LED or a laser, and the light detector comprises a photo-detector.

16. An apparatus according to claim 1, wherein the optical wave-guide comprises an optical fibre.

17. The apparatus according to claim 4, wherein the electronic device comprises a mobile telephone.

18. A method comprising:
transmitting light through an optical wave-guide connected between a first member and a second member;
detecting an optical power level of light emitted from the optical wave-guide, wherein the optical wave-guide is physically distorted by actuation of a hinge connected between the first member and the second member; and
determining the position of the hinge based on the detected optical power level.

* * * * *